(12) United States Patent
Nishikawa et al.

(10) Patent No.: US 10,105,777 B2
(45) Date of Patent: Oct. 23, 2018

(54) JOINING METHOD AND JOINING SYSTEM

(71) Applicant: MITSUBISHI HEAVY INDUSTRIES, LTD., Tokyo (JP)

(72) Inventors: Kosuke Nishikawa, Tokyo (JP); Hiroyuki Kobayashi, Tokyo (JP); Hiroyasu Manako, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 290 days.

(21) Appl. No.: 14/806,992

(22) Filed: Jul. 23, 2015

(65) Prior Publication Data
US 2016/0023292 A1 Jan. 28, 2016

(30) Foreign Application Priority Data

Jul. 25, 2014 (JP) .................. 2014-152296

(51) Int. Cl.
*B23K 1/00* (2006.01)
*B23K 1/19* (2006.01)
(Continued)

(52) U.S. Cl.
CPC .......... *B23K 1/0006* (2013.01); *B23K 1/0008* (2013.01); *B23K 1/19* (2013.01); *B23K 3/04* (2013.01); *B23K 35/302* (2013.01); *B23K 35/3006* (2013.01); *B23K 35/3013* (2013.01); *B23K 35/3033* (2013.01); *B23K 35/322* (2013.01); *C23C 18/1632* (2013.01); *C23C 18/42* (2013.01); *C23C 18/48* (2013.01);
(Continued)

(58) Field of Classification Search
CPC .... B23K 35/0238; B23K 1/19; B23K 1/0008; B32B 15/01

USPC ............ 428/607; 228/252, 262.72, 249, 56.3
See application file for complete search history.

(56) References Cited

U.S. PATENT DOCUMENTS 3,560,172 A * 2/1971 Kench ...................... B23K 1/19
428/593
4,034,454 A * 7/1977 Galasso ............... B23K 35/005
228/194
(Continued)

FOREIGN PATENT DOCUMENTS

JP 61-246354 11/1986
JP 03-248766 11/1991
(Continued)

OTHER PUBLICATIONS

Notification of Reasons for Refusal dated Oct. 4, 2017 in corresponding Japanese patent Application No. 2014-152296, with English-language translation.

*Primary Examiner* — Erin B Saad
(74) *Attorney, Agent, or Firm* — Wenderoth, Lind & Ponack, L.L.P.

(57) ABSTRACT

A joining method for joining a first member and a second member is provided. The joining method includes a step of providing a first brazing layer on the first member by plating, a step of providing a second brazing layer on the first brazing layer by plating, a step of arranging the first member and the second member to oppose each other across the first brazing layer and the second brazing layer, and a step of melting the first brazing layer and the second brazing layer to join the first member and the second member which are arranged to oppose each other.

11 Claims, 13 Drawing Sheets

(51) Int. Cl.
    *B23K 3/04*        (2006.01)
    *B23K 35/30*      (2006.01)
    *B23K 35/32*      (2006.01)
    *C25D 7/04*       (2006.01)
    *C25D 5/12*       (2006.01)
    *C25D 5/50*       (2006.01)
    *C25D 3/50*       (2006.01)
    *C25D 3/48*       (2006.01)
    *C25D 3/46*       (2006.01)
    *C25D 3/38*       (2006.01)
    *C25D 3/12*       (2006.01)
    *C25D 17/02*      (2006.01)
    *C23C 18/48*      (2006.01)
    *C23C 18/42*      (2006.01)
    *C23C 18/16*      (2006.01)
    *C25D 5/10*       (2006.01)
    *C23C 28/02*      (2006.01)
    *B23K 103/18*     (2006.01)
    *B23K 103/12*     (2006.01)
    *B23K 103/08*     (2006.01)
    *B23K 101/34*     (2006.01)
    *B23K 103/22*     (2006.01)

(52) U.S. Cl.
    CPC .............. *C23C 28/023* (2013.01); *C25D 3/12* (2013.01); *C25D 3/38* (2013.01); *C25D 3/46* (2013.01); *C25D 3/48* (2013.01); *C25D 3/50* (2013.01); *C25D 5/10* (2013.01); *C25D 5/12* (2013.01); *C25D 5/50* (2013.01); *C25D 7/04* (2013.01); *C25D 17/02* (2013.01); *B23K 2201/34* (2013.01); *B23K 2203/08* (2013.01); *B23K 2203/12* (2013.01); *B23K 2203/18* (2013.01); *B23K 2203/22* (2013.01)

(56) References Cited

U.S. PATENT DOCUMENTS

| | | | |
|---|---|---|---|
| 5,701,670 A | 12/1997 | Fisher et al. | |
| 6,249,967 B1 | 6/2001 | Kreiner et al. | |
| 2004/0093852 A1* | 5/2004 | Fint | B23P 15/008 60/267 |
| 2006/0131359 A1* | 6/2006 | Pohlman | B23K 1/19 228/56.3 |
| 2009/0068446 A1 | 3/2009 | Bischof et al. | |

FOREIGN PATENT DOCUMENTS

| | | |
|---|---|---|
| JP | 11-132108 | 5/1999 |
| JP | 2004-169702 | 6/2004 |
| JP | 2013-176779 | 9/2013 |
| JP | 2013-176780 | 9/2013 |

* cited by examiner

JOINING METHOD AND JOINING SYSTEM

CROSS REFERENCE

This application claims a priority based on Japan Patent Application No. JP 2014-152296 filed on Jul. 25, 2014, the disclosure of which is hereby incorporated by reference herein in its entirety.

TECHNICAL FIELD

The present invention relates to a joining method, and a joining system.

BACKGROUND ART

A technique in which a first member and a second member are joined to each other via a brazing material is known. In this technique, if a foil is provided on the first member and the foil is used as the brazing material, there is a possibility that the foil is separated from the first member. If alloy plating is applied on the first member and the alloy plating is used as the brazing material, it is necessary to prepare a plating bath containing molten metal alloy in advance.

As a related technique to the joining method, Patent Literature 1 discloses manufacturing method of an aluminum tube having many holes for a heat exchanger. The method includes a step of hot-dipping for plating a brazing material including Zn or Zn alloy on the tube. Patent Literature 2 discloses a technique in which a copper alloy liner, a stainless steel jacket and a throat support are joined using brazing alloy foil. Patent Literature 3 discloses a technique in which a cooling fluid liner, an inner conformal throat support sections, an outer conformal throat support sections, an inlet manifold and an outlet manifold are joined using blaze alloy. Patent Literature 4 discloses a technique for joining the first base member and the second base member using a brazing foil.

CITATION LIST

Patent Literature

[Patent Literature 1] Japanese Patent Application Publication JP S61-246354 A
[Patent Literature 2] U.S. Pat. No. 5,701,670
[Patent Literature 3] Japanese Patent Application Publication JP 2004-169702 A
[Patent Literature 4] Japanese Patent Application Publication JP 2013-176779 A

SUMMARY

An object of the present invention is to provide a joining method and a joining system with which a brazing material composed of more than one kind of material is used and it is possible to reduce an equipment cost.

According to some embodiment, a joining method for joining a first member and a second member is provided. The method includes: providing a joining layer on the first member; arranging the first member and the second member to oppose each other across the joining layer; and melting the joining layer to join the first member and the second member which are arranged to oppose each other. The step of providing a joining layer on the first member includes: providing a first brazing layer on the first member by plating; and providing a second brazing layer on the first brazing layer by plating. In the method, a first material constituting (i.e. comprising) the first brazing layer is a material different from a second material constituting (i.e. comprising) the second brazing layer.

According to some embodiment, a joining system for joining a first member and a second member is provided. The system includes a first plating device, a second plating device, a holding device and a heating device. The first plating device plates a first brazing layer of a first material on the first member. The second plating device plates a second brazing layer of a second material on the first brazing layer. The first brazing layer and the second brazing layer constitute a joining layer. The holding device holds the first member and the second member in a state in which the first member and the second member are arranged to oppose each other across the joining layer. The heating device melts the joining layer to join the first member and the second member which are arranged to oppose each other.

According to the present invention, it is possible to provide the joining method and the joining system with which the brazing material composed of more than one kind of material is used and to reduce the equipment cost.

BRIEF DESCRIPTION OF THE DRAWINGS

The accompanying drawings are incorporated into the specification to assist in explaining some embodiments. The drawings are not to be construed as limiting the inventions to only those examples illustrated and described.

FIG. 10 is a cross sectional view of the section S in FIG. 9B for indicating the second state in the joining method according to the third embodiment.

DESCRIPTION OF EMBODIMENTS

Figure 1A:
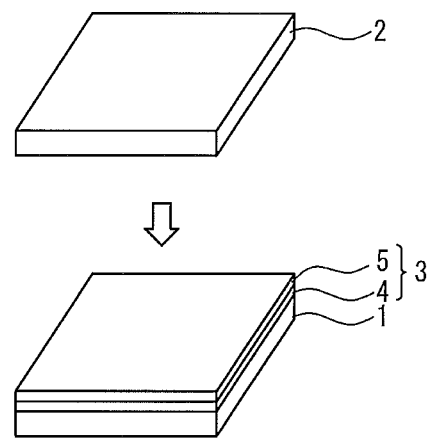
FIG. 1A is a perspective view for indicating a first state in a joining method according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following, referring to the attached drawings, a joining method according to some embodiments will be explained.

First Embodiment

Figure 1B:
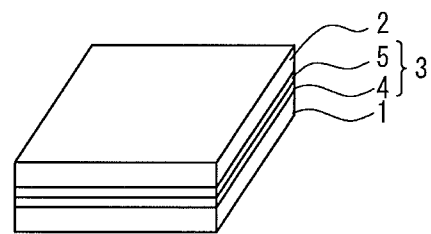
FIG. 1B is a perspective view for indicating a second state in the joining method according to the first embodiment.
Figure 1C:
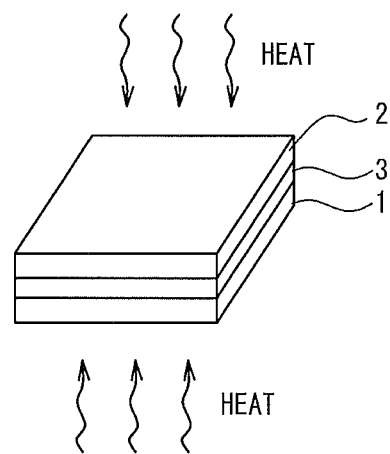
Figure 2:
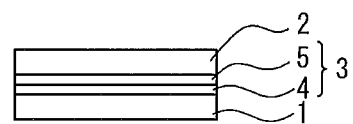
FIG. 2 is a cross sectional view for indicating the second state in the joining method according to the first embodiment.
Figure 10:
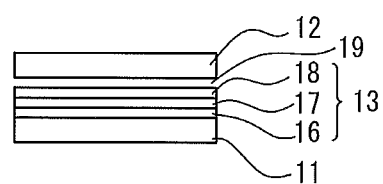
FIG. 10 is a perspective view for indicating a third state in the joining method according to the first embodiment.

Referring to FIGS. 1A to 2, a joining method according to a first embodiment will be explained. FIG. 1A is the perspective view for indicating a first state in the joining method according to the first embodiment. FIG. 1B is the perspective view for indicating a second state in the joining method according to the first embodiment. FIG. 10 is the perspective view for indicating a third state in the joining method according to the first embodiment. FIG. 2 is the cross sectional view for indicating the second state in the joining method according to the first embodiment.

(Members to be Joined)

In the present embodiment, a first member 1 and a second member 2 are joined via a joining layer 3. The first member 1 is formed of, for example, a metal. Also, the second member 2 is formed of, for example, a metal identical to or different from the metal of the first member 1.

(Joining Layer)

The joining layer 3 includes at least a first brazing layer 4 and a second brazing layer 5. A first material of the first brazing layer 4 and a second material of the second brazing layer 5 are different from each other. The first material and the second material may be Au and Ni, respectively, or may be Ni and Au, respectively. Alternatively, the first material and the second material may be Au and Cu, respectively, or may be Cu and Au, respectively. Note that selection of the first material and the second material is not limited to the above-mentioned example and is arbitrary. The first material is preferably formed of a single substance having the purity of 99.9 weight percent or more. The second member is preferably formed of a single substance having the purity of 99.9 weight percent or more.

(Process of Providing First Brazing Layer on First Member)

A process of providing the joining layer 3 on the first member 1 includes a process of providing the first brazing layer 4 on the first member 1 by plating onto the first member 1. The plating onto the first member 1 is, for example, electroplating, electroless plating or hot-dip plating (note that the hot-dip plating may not be suitable for an Au, Ag, and Cu system or a Pd, Ag, and Cu system, which is described later). The plating is carried out by, for example, immersing the first member 1 in a plating bath (not shown) containing the first material. Alternatively, the plating may be carried out by applying plating liquid containing the first material on the first member 1 without using the plating bath. Note that a masking tape and so on may be put on in advance a surface of the first member 1 on which it is not necessary to provide the joining layer 3. The masking tape prevents the joining layer 3 from being applied to the surface on which it is not necessary to provide the joining layer 3.

(Process of Providing Second Brazing Layer on First Brazing Layer)

A process of providing the joining layer 3 on the first member 1 includes a process of providing the second brazing layer 5 on the first brazing layer 4 by plating onto the first brazing layer 4. The plating onto the first brazing layer 4 is, for example, electroplating, electroless plating or hot-dip plating (note that the hot-dip plating may not be suitable for an Au, Ag, and Cu system or a Pd, Ag, and Cu system, which is described later). The plating is carried out by, for example, immersing the first member 1 provided with the first brazing layer 4 in a plating bath (not shown) containing the second material. Alternatively, the plating may be carried out by applying plating liquid containing the second material on the first brazing layer 4 without using the plating bath. FIG. 1A indicates a state after the first brazing layer 4 and the second brazing layer 5 are provided over the first member 1.

(Process of Arranging First Member and Second Member to Oppose Each Other)

As shown by the arrow in FIG. 1A, the second member 2 is relatively moved to approach the first member 1. FIG. 1B and FIG. 2 indicate a state in which the first member 1 and the second member 2 are arranged to oppose each other across the joining layer 3 as a result of the relative movement. As shown in FIG. 1B and FIG. 2, the joining layer 3 may be arranged to contact the second member 2. Alternatively, the joining layer 3 may be arranged to oppose the second member 2 across (i.e. through) a small gap. Note that in the case in which the joining layer 3 and the second member 2 are arranged to oppose each other across the small gap, it is necessary to make the joining layer 3 and the second member 2 contact each other in a process of melting the joining layer, which is described later. For example, the first member 1 and the second member 2 may be brought into contact by applying an external force in the process of melting the joining layer 3. Any method may be adopted as the method of applying the external force. For example, a pressure may be applied to one of the first member 1 and the second member 2 in a direction in which the first member 1 relatively approaches the second member 2. Alternatively, the joining layer 3 and the second member 2 may be brought into contact by vacuuming a space between the joining layer 3 and the second member 2. Alternatively, the joining layer 3 and the second member 2 may be brought into contact by linear expansion of the first member 1 and the second member 2 caused by heating. Alternatively, the joining layer 3 and the second member 2 may be brought into contact using the difference between the linear expansion of the first member 1 and the linear expansion of the second member (i.e. the difference in a linear expansion coefficient) caused by heating. The small gap is, for example a gap ranging from 1 μm to 0.2 mm. The opposing arrangement may be maintained by a jig (not shown). Alternatively, the opposing arrangement may be maintained by a table (not shown) to support the first member 1 and a chuck tool (not shown) to hold the second member 2. Alternatively, the opposing arrangement may be realized by merely putting the second member 2 on the joining layer 3.

(Process of Melting Joining Layer)

FIG. 10 indicates a state after melting the joining layer 3 by heating the joining layer 3 which is arranged between the first member 1 and the second member 2. The heating may be carried out in a heating furnace (a vacuum heating furnace, a heating furnace having an inert gas atmosphere, and so on). Alternatively, the heating may be carried out by irradiating an electron beam to the joining layer 3. The joining layer 3 is melted by the heating. Note that in the case in which the joining layer 3 and second member 2 are arranged to oppose each other across the small gap as described above, it is necessary to bring the joining layer 3 and the second member 2 into contact during the heating. The method of bringing the joining layer 3 and the second member 2 into contact includes, for example, the method of applying the pressure to at least one of the members in the direction in which the first member 1 relatively approaches the second member 2, the method of vacuuming the space between the joining layer 3 and the second member 2 or the method of using the difference in the linear expansion coefficient, as described above. When the first material of the first brazing layer 4 and the second material of the second brazing layer 5 are eutectic materials, the eutectic melting occurs from the boundary between the first material and the second material. The first member 1 and the second member 2 are firmly bonded through the joining layer 3 in the process in which the melted first material and the melted second material are mixed and the melted materials are solidified. Note that the eutectic melting is melting caused by eutectic reaction. When composition of two metals in a mutually diffused region, that is a region in which two metals have been mutually diffused, becomes eutectic composition, a liquid phase (molten phase) is formed by the eutectic reaction in a state in which retention temperature is equal to or more than eutectic temperature.

In the present embodiment, since the plating liquid of the first material and the plating liquid of the second material are separately applied on the first member 1 and the first brazing layer 4 on the first member 1, respectively, it is not necessary to prepare plating liquid containing mixed material. The plating liquid of the mixed material has lower applicability than the plating liquid of a single material. In addition, in the case in which the plating liquid of the mixed material is prepared, additional costs for storing the plating liquid of the mixed material, washing an apparatus to which the plating liquid of the mixed material has stuck and so on will be necessary. In the present embodiment, such additional costs can be suppressed.

In addition, in the present embodiment, even when heat-resistant temperatures of the first member 1 and the second member 2 are low, it is possible to adapt to the low heat-resistant temperatures by lowering a melting point of the joining layer 3 using the eutectic melting (note that the eutectic temperature is lower than the melting point of the first member 1 and is lower than the melting point of the second member 2).

Second Embodiment

Figure 3A:
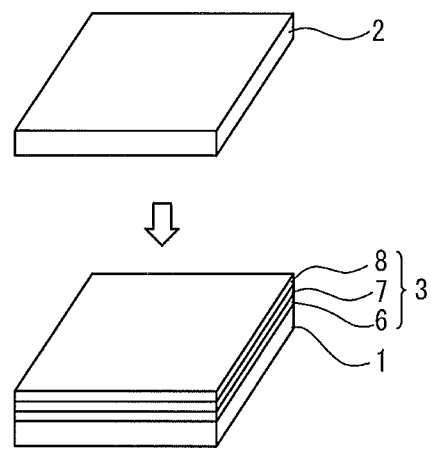
FIG. 3A is a perspective view for indicating a first state in the joining method according to a second embodiment.
Figure 3B:
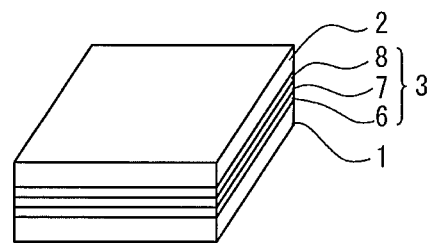
FIG. 3B is a perspective view for indicating a second state in the joining method according to the second embodiment.
Figure 3C:
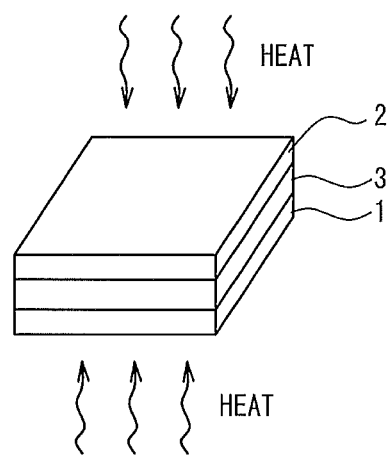
FIG. 3C is a perspective view for indicating a third state in the joining method according to the second embodiment.
Figure 4:
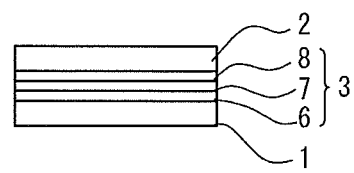
FIG. 4 is a cross sectional view for indicating the second state in the joining method according to the second embodiment.

Referring to FIGS. 3A to 4, the joining method according to a second embodiment will be explained. FIG. 3A is the perspective view for indicating the first state in the joining method according to the second embodiment. FIG. 3B is the perspective view for indicating the second state in the joining method according to the second embodiment. FIG. 3C is the perspective view for indicating the third state in the joining method according to the second embodiment. FIG. 4 is the cross sectional view for indicating the second state in the joining method according to the second embodiment.

The second embodiment is different from the first embodiment in a point in which the joining layer 3 is constituted by the first brazing layer 6 formed of the first material, the second brazing layer 7 formed of the second material and a third brazing layer 8 formed of third material in the second embodiment.

(Members to be Joined)

In the present embodiment, the first member 1 and the second member 2 are joined via the joining layer 3. The first member 1 is formed of, for example, the metal. Also, the second member 2 is formed of, for example, the metal identical to or different from the metal of the first member 1.

(Joining Layer)

The joining layer 3 includes at least the first brazing layer 6, the second brazing layer 7 and the third brazing layer 8. The first material constituting the first brazing layer 6 and the second material constituting the second brazing layer 7 are different from each other. In addition, the second material constituting the second brazing layer 7 and the third material constituting the third brazing layer 8 are different from each other. The first material constituting the first brazing layer 6 and the third material constituting the third brazing layer 8 may be the same with each other or may be different from each other. Each of the first material, the second material and the third material may be selected from the group consisting of Au, Ag and Cu. Alternatively, each of the first material, the second material and the third material may be selected from the group consisting of Pd, Ag and Cu. Note that the selection of the first material, the second material and the third material is not limited to the above-mentioned example and is arbitrary. The first material is preferably formed of a single substance having the purity of 99.9 weight percent or more. The second material is preferably formed of a single substance having the purity of 99.9 weight percent or more. The third material is preferably formed of a single substance having the purity of 99.9 weight percent or more.

(Process of Providing First Brazing Layer on First Member)

The process of providing the joining layer 3 on the first member 1 includes the process of providing the first brazing layer 6 on the first member 1 by plating onto the first member 1. The plating onto the first member 1 is, for example, the electroplating, the electroless plating or the hot-dip plating (note that the hot-dip plating may not be suitable for the Au, Ag, and Cu system or the Pd, Ag, and Cu system, which is described later). The plating is carried out by, for example, immersing the first member 1 in the plating bath (not shown) containing the first material. Alternatively, the plating may be carried out by applying the plating liquid containing the first material on the first member 1 without using the plating bath. Note that the masking tape and so on may be put on in advance the surface of the first member 1 on which it is not necessary to provide the joining layer 3. The masking tape prevents the joining layer 3 from being applied to the surface on which it is not necessary to provide the joining layer 3.

(Process of Providing Second Brazing Layer on First Brazing Layer)

The process of providing the joining layer 3 on the first member 1 includes the process of providing the second brazing layer 7 on the first brazing layer 6 by plating onto the first brazing layer 6. The plating onto the first brazing layer 6 is, for example, the electroplating, the electroless plating or the hot-dip plating (note that the hot-dip plating may not be suitable for the Au, Ag, and Cu system or the Pd, Ag, and Cu system, which is described later). The plating is carried out by, for example, immersing the first member 1 provided with the first brazing layer 6 in the plating bath (not shown) containing the second material. Alternatively, the plating may be carried out by applying the plating liquid containing the second material on the first brazing layer 6 without using the plating bath.

(Process of Providing Third Brazing Layer on Second Brazing Layer)

The process of providing the joining layer 3 on the first member 1 includes a process of providing the third brazing layer 8 on the second brazing layer 7 by plating onto the second brazing layer 7. The plating onto the second brazing layer 7 is, for example, the electroplating, the electroless plating or the hot-dip plating (note that the hot-dip plating may not be suitable for the Au, Ag, and Cu system or the Pd, Ag, and Cu system, which is described later). The plating is carried out by, for example, immersing the first member 1 provided with the first brazing layer 6 and the second brazing layer 7 in the plating bath (not shown) containing the third material. Alternatively, the plating may be carried out by applying plating liquid containing the third material on the second brazing layer 7 without using the plating bath. FIG. 3A shows a state after the first brazing layer 6, the second brazing layer 7 and the third brazing layer 8 are provided over the first member 1.

(Process of Arranging First Member and Second Member to Oppose Each Other)

As indicated by the arrow in FIG. 3A, the second member 2 is relatively moved to approach the first member 1. FIG. 3B and FIG. 4 indicate a state in which the first member 1 and the second member 2 are arranged to oppose each other across the joining layer 3 as a result of the relative movement. As shown in FIG. 3B and FIG. 4, the joining layer 3 may be arranged to contact the second member 2. Alternatively, the joining layer 3 may be arranged to oppose the second member 2 across (i.e. through) the small gap. Note that in the case in which the joining layer 3 and the second member 2 are arranged to oppose each other across the small gap, it is necessary to make the joining layer 3 and the second member 2 contact each other in the process of melting the joining layer, which is described later. For example, the first member 1 and the second member 2 may be brought into contact by applying the external force in the process of melting the joining layer 3. Any method may be adopted as the method of applying the external force. For example, the pressure may be applied to one of the first member 1 and the second member 2 in the direction in which the first member 1 relatively approaches the second member 2. Alternatively, the joining layer 3 and the second member 2 may be brought into contact by vacuuming the space between the joining layer 3 and the second member 2. Alternatively, the joining layer 3 and the second member 2 may be brought into contact by the linear expansion of the first member 1 and the second member 2 caused by heating. Alternatively, the joining layer 3 and the second member 2 may be brought into contact using the difference between the linear expansion of the first member 1 and the linear expansion of the second member 2 (i.e. the difference in the linear expansion coefficient) caused by heating. The small gap is, for example, a gap ranging from 1 μm to 0.2 mm. The opposing arrangement may be maintained by the jig (not shown). Alternatively, the opposing arrangement may be maintained by the table (not shown) to support the first member 1 and the chuck tool (not shown) to hold the second member 2. Alternatively, the opposing arrangement may be realized by merely putting the second member 2 on the joining layer 3.

(Process of Melting Joining Layer)

FIG. 3C indicates a state after melting the joining layer 3 by heating the joining layer 3 which is arranged between the first member 1 and the second member 2. The heating may be carried out in the heating furnace (the vacuum heating furnace, the heating furnace having the inert gas atmosphere, and so on). Alternatively, the heating may be carried out by irradiating the electron beam to the joining layer 3. The joining layer 3 is melted by the heating. Note that in the case in which the joining layer 3 and second member 2 are arranged to oppose each other across (i.e. through) the small gap as described above, it is necessary to bring the joining layer 3 and the second member 2 into contact during the heating. The method of bringing the joining layer 3 and the second member 2 into contact includes, for example, the method of applying the pressure to at least one of the members in the direction in which the first member 1 relatively approaches the second member 2, the method of vacuuming the space between the joining layer 3 and the second member 2, the method of using the difference in the linear expansion coefficient, as mentioned above.

For example, when the first material constituting the first brazing layer 6 and the second material constituting the second brazing layer 7 are eutectic materials, the eutectic melting occurs from the boundary between the first material and the second material. It is preferable to select the second material such that melting of the second material proceeds more rapidly than melting of the first material in the eutectic melting, that is to select the second material such that an amount of melted second material is greater than an amount of melted first material in the eutectic melting. In the case in which the melting of the second material proceeds more rapidly than the melting of the first material, melting of the third material is induced by the melting of the second material before the melting of the first material completes. Therefore, this case is preferable since the melting of the first material and the melting of the third material progress at the same time.

On the other hand, a case in which the second material is selected such that the melting of the second material proceeds less rapidly than the melting of the first material in the eutectic melting will be considered. In this case, the melting of the first material completes prior to a timing at which the melting of the second material induces the melting of the third material. Therefore, it is impossible to use the eutectic melting of the first material and the second material in the melting of the third material.

(Example of Successful Sequences for Joining)

Figure 5:
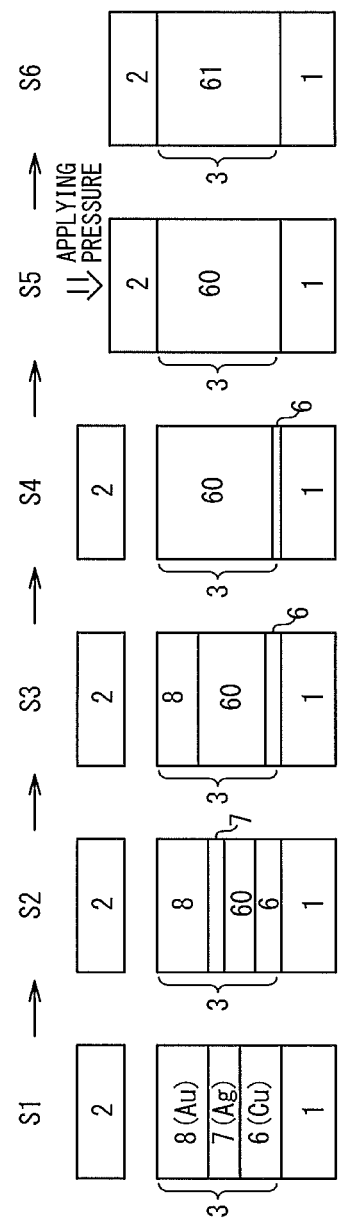
FIG. 5 is a diagram for indicating an example of successful sequences for joining.
Figure 6:
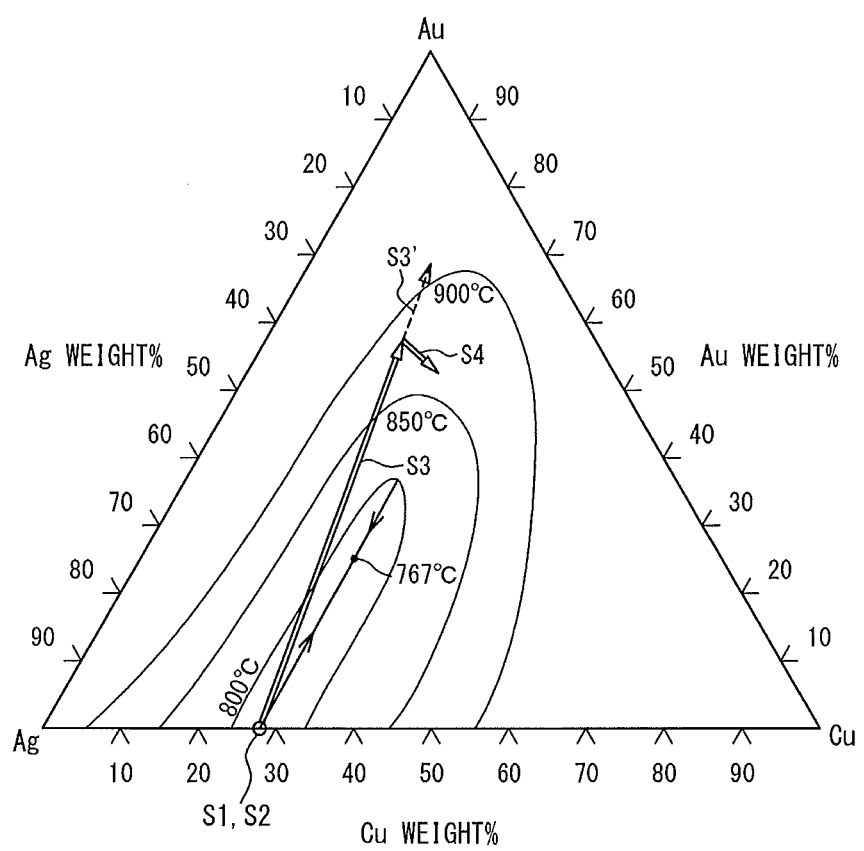
FIG. 6 is a ternary phase diagram.

Referring to FIG. 5 and FIG. 6, in the case in which the melting of the second material proceeds more rapidly than the melting of the first material, a mechanism in which the melting of the third material is induced by the melting of the second material will be explained. FIG. 5 is the diagram for indicating an example of the successful sequences for joining. FIG. 6 is a map for indicating a liquidus line as well as the ternary phase diagram. For example, the joining temperature of the first member 1 and the second member 2, in the other words, the joining temperature of the second member 2 and the joining layer 3 is supposed to be 900 degrees Celsius.

In step 1 (S1), the first member 1, the second member 2 and the joining layer 3 are prepared. The joining layer 3 includes the first material (the first brazing layer 6), the second material (the second brazing layer 7) and the third material (the third brazing layer 8), which have been plated on the first member 1 in the order of the first material, the second material and the third material. In addition, the joining layer 3 and the second member 2 are arranged to oppose each other across (i.e. through) the small gap. Also, in the step 1 (S1), the joining layer 3 is heated. The first member 1 and the second member 2 may be heated together with the joining layer 3. For example, when the first material (the first brazing layer 6) is Cu, the second material (the second brazing layer 7) is Ag and the third material (third brazing layer 8) is Au, the melting of the joining layer 3 is initiated in the boundary between the Ag layer (the second brazing layer 7) and the Cu layer (the first brazing layer 6). When Ag occupies about 70 weight percent and Cu occupies about 30 weight percent, the eutectic melting temperature is about 780 degrees Celsius as shown in FIG. 6.

In step 2 (S2), the eutectic melting progresses in the Ag layer (the second brazing layer 7) and the Cu layer (the first brazing layer 6). The eutectic melting progresses approximately in the rate of Ag: about 70 weight percent and Cu: about 30 weight percent. That is, the melting of the Ag layer (the second brazing layer 7) progresses more rapidly than the melting of the Cu layer (the first brazing layer 6). In the step 2 (S2), before the melting of the Cu layer (the first brazing layer 6) completes, the melted layer 60 reaches the boundary between the Au layer (the third brazing layer 8) and the Ag layer (the second brazing layer 7).

In step 3 (S3), since the Ag layer (the second brazing layer 7) does not any more exist, the melted layer 60 is enlarged in accordance with the melting of the Cu layer (the first brazing layer 6) and the Au layer (the third brazing layer 8). As the rate of Au and Cu in the melted layer 60 increases, the eutectic melting temperature (i.e. the eutectic point) increases (as indicated by the arrow S3 in FIG. 6). However, the eutectic melting temperature is kept 900 degrees Celsius, which is the joining temperature, or less. In the step 3 (S3), the Au layer (the third brazing layer 8) is melted completely.

In step 4 (S4), since the Ag layer (the second brazing layer 7) and the Au layer (the third brazing layer 8) do not any more exist, the melted layer 60 is enlarged in accordance with the melting of the Cu layer (the first brazing layer 6). As the rate of Cu in the melted layer 60 increases, the eutectic melting temperature changes (as indicated by the arrow S4 in FIG. 6). However, the eutectic melting temperature is kept 900 degrees Celsius, which is the joining temperature, or less. In the step 4 (S4), the Cu layer (the first brazing layer 6) is melted completely. As a result, all the layers constituting the joining layer 3 (i.e. the Au layer, the Ag layer and the Cu layer) are melted completely.

In step 5 (S5), the second member 2 is forced toward the joining layer 3, that is toward the melted layer 60, such that the second member 2 and the joining layer 3 are brought into contact with each other.

In step 6 (S6), after the heating ends, the melted layer 60 is solidified to form a solidification layer 61. In this way, the joining of the first member 1 and the second member 2 is successfully completed.

Note that when the Au layer is too thick, the eutectic melting temperature among Au, Ag and Cu may exceed 900 degrees Celsius and the melted layer 60 is solidified in the step 3 (as indicated by the arrow S3' in FIG. 6). Therefore, it is required to appropriately set the thickness of each brazing layer in advance so that the eutectic melting in the steps 1 to 4 proceeds at the temperature of 900 degrees Celsius or less, that is the eutectic melting proceeds in a region inside the 900 degrees Celsius line in FIG. 6 of the ternary phase diagram.

Note that, in the above, in the step 2, the example in which the melted layer 60 reaches the boundary between the Au layer (the third brazing layer 8) and the Ag layer (the second brazing layer 7) before the Cu layer (the first brazing layer 6) completely melts has been explained. However, the present embodiment is not limited to the above-mentioned example. For example, the time when the melted layer 60 reaches the boundary between the Au layer (the third brazing layer 8) and the Ag layer (the second brazing layer 7) and the time when the melted layer 60 reaches the boundary between the first member 1 and the Cu layer (the first brazing layer 6) may be approximately the same time, or the time of the latter may be slightly earlier than the time of the former. Also, in the step 3, the example in which the Au layer (the third brazing layer 8) completely melts before the Cu layer completely melts has been explained. Alternatively, the time when the melting of the Au layer completes and the time when the melting of the Cu layer completes may be approximately the same time, or the time of the latter may be slightly earlier than the time of the former.

(Example of Unsuccessful Sequences for Joining)

Figure 7:
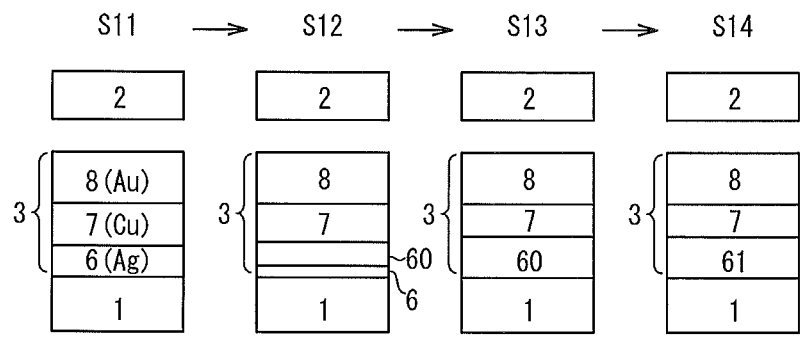
FIG. 7 is a diagram for indicating an example of unsuccessful sequences for joining.
Figure 8:
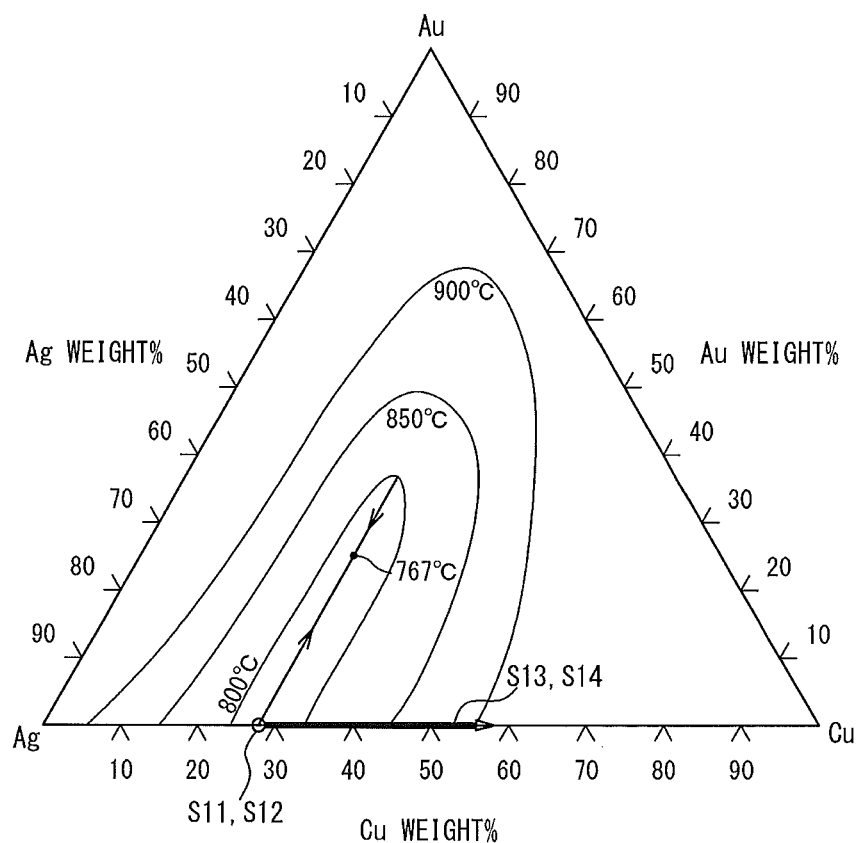
FIG. 8 is a ternary phase diagram.

Next, referring to FIG. 7 and FIG. 8, a case in which the melting of the second material proceeds less rapidly than the melting of the first material will be explained. FIG. 7 is the diagram for indicating an example of the unsuccessful sequences for joining. FIG. 8 is the map for indicating the liquidus line as well as the ternary phase diagram. For example, the joining temperature of the first member 1 and the second member 2, in the other words, the joining temperature of the second member 2 and the joining layer 3 is supposed to be 900 degrees Celsius.

In step 11 (S11), the first member 1, the second member 2 and the joining layer 3 are prepared. The joining layer 3 includes the first material (the first brazing layer 6), the second material (the second brazing layer 7) and the third material (the third brazing layer 8), which have been plated on the first member 1 in the order of the first material, the second material and the third material. In addition, the joining layer 3 and the second member 2 are arranged to oppose each other across (i.e. through) the small gap. Also, in the step 11 (S11), the joining layer 3 is heated. The first member 1 and the second member 2 may be heated together with the joining layer 3. For example, when the first material (the first brazing layer 6) is Ag, the second material (the second brazing layer 7) is Cu and the third material (third brazing layer 8) is Au, the melting of the joining layer 3 is initiated in the boundary between the Cu layer (the second brazing layer 7) and the Ag layer (the first brazing layer 6). When Ag occupies about 70 weight percent and Cu occupies about 30 weight percent, the eutectic melting temperature is about 780 degrees Celsius as shown in FIG. 8.

In step 12 (S12), the eutectic melting progresses in the Ag layer (the first brazing layer 6) and the Cu layer (the second brazing layer 7). The eutectic melting progresses approximately in the rate of Ag: about 70 weight percent and Cu: about 30 weight percent. That is, the melting of the Ag layer (the first brazing layer 6) progresses more rapidly than the melting of the Cu layer (the second brazing layer 7). In the step 12 (S12), before the melting of the Cu layer (the second brazing layer 7) completes, the melted layer 60 reaches the boundary between the first member 1 and the Ag layer (the first brazing layer 6).

In step 13 (S13), since the Ag layer does not any more exist, the melted layer 60 is enlarged in accordance with the melting of the Cu layer (the second brazing layer 7). As the rate of Cu in the melted layer 60 increases, the eutectic melting temperature increases.

In step 14 (S14), when the rate of Cu in the melted layer 60 increases so that the eutectic melting temperature exceeds 900 degrees Celsius (as indicated by the arrow S13, S14 in FIG. 8), the melted layer 60 is solidified and becomes the solidification layer 61. As explained above, a part of the Cu layer (the second brazing layer 7) and the whole Au layer (the third brazing layer 8) do not melt in the joining temperature of 900 degrees Celsius. Therefore, the joining of the first member 1 and the second member 2 is failed.

(In Case in which Second Material and Third Material are Eutectic Materials)

In the above example, the example in which the first material and the second material are the eutectic materials has been explained. Additionally or alternatively, the second material constituting the second brazing layer 7 and the third material constituting the third brazing layer 8 may be the eutectic materials. In this case, the eutectic melting is initiated from the boundary between the second material and the third material. It is preferable to select the second material such that the melting of the second material proceeds more rapidly than the melting of the third material in the eutectic melting, that is to select the second material such that an amount of melted second material is greater than an amount of melted third material in the eutectic melting. In the case in which the melting of the second material proceeds more rapidly than the melting of the third material, the melting of the first material is induced by the melting of the second material before the melting of the third material completes. Therefore, this case is preferable since the melting of the third material and the melting of the first material progress at the same time.

The first member 1 and the second member 2 are firmly bonded through the joining layer 3 in the process in which the melted first material, the melted second material and the melted third material are mixed and the melted materials are solidified.

In the present embodiment, it is possible to select Cu as the first material constituting the first brazing layer 6, to select Ag as the second material constituting the second brazing layer 7 and to select Au as the third material constituting the third brazing layer 8. Regarding the case in which the first material is Cu, the second material is Ag and the third material is Au, the melting of the joining layer 3 will be considered. The eutectic point (i.e. the eutectic melting temperature) of Cu and Ag is lower than the eutectic point of Ag and Au. Also, the eutectic point of Cu and Ag is lower than the melting point (i.e. the melting temperature) of Cu, is lower than the melting point of Ag and is lower than the melting point of Au. Therefore, the melting of the joining layer 3 is initiated at the eutectic point of Cu and Ag (about 780 degrees Celsius) from the boundary plane between the first brazing layer 6 (Cu as the first material) and the second brazing layer 7 (Ag as the second material). The eutectic melting of Cu and Ag progresses in a state of Ag rich (i.e. in a state in which an amount of the melted Ag is greater than an amount of the melted Cu). Therefore, the melting of Ag proceeds and reaches the boundary plane between Ag and Au before the whole Cu is melted. The melting of Ag in the boundary plane between Ag and Au induces the melting of Au. As a result, the melting of Ag, the melting of Cu and the melting of Au progress simultaneously.

Note that when Au is selected as the first material constituting the first brazing layer 6 instead of Cu, Ag is selected as the second material constituting the second brazing layer 7 and Cu is selected as the third material constituting the third brazing layer 8 instead of Au, the above-mentioned phenomenon occurs similarly.

That is, in the case in which one of Au, Ag and Cu is used as the first brazing layer 6, one of the rest of Au, Ag and Cu is used as the second brazing layer 7 and the rest of Au, Ag and Cu is used as the third brazing layer 8, it is preferable to use Ag as the second brazing layer 7, which is the middle layer, to use Au as either one of the first brazing layer 6 or the third brazing layer 8, and to use Cu as the other one of the first brazing layer 6 or the third brazing layer 8.

Regarding Au, Ag and Cu, by using such arrangement, it is possible to completely melt the first brazing layer 6, the second brazing layer 7 and the third brazing layer 8 at the temperature of 900 degrees Celsius or less. Therefore, even when the first member 1 or the second member 2 is formed of a material which can be damaged by heating over 900 degrees Celsius, it is possible to join the first member 1 and the second member 2 each other via the joining layer 3 by melting the joining layer 3 at the temperature of 900 degrees Celsius or less. Note that in this paragraph and in the previous paragraph, Au can be replaced with Pd.

In the case in which Au, Ag and Cu are used as the materials constituting the joining layer 3, the joining layer 3 preferably contains 50 to 80 weight percent of Au, 5 to 30 weight percent of Ag and 10 to 30 weight percent of Cu. More preferably, the joining layer 3 contains 60 to 75 weight percent of Au, 5 to 20 weight percent of Ag and 15 to 20 weight percent of Cu. Note that in the case in which Au, Ag and Cu are used as the materials constituting the joining layer 3, the joining layer 3 preferably contains 25 to 40 volume percent (i.e. 25 to 40 thickness percent) of Au, 5 to 30 volume percent (i.e. 5 to 30 thickness percent) of Ag and 10 to 30 volume percent (i.e. 10 to 30 thickness percent) of Cu. More preferably, the joining layer 3 contains 30 to 37.5 volume percent of Au, 5 to 20 volume percent of Ag and 15 to 20 volume percent of Cu.

In the case in which the above-mentioned ratio (percentage) is used, the eutectic melting of the joining layer 3 securely proceeds.

In addition, it is preferable that the thickness of the joining layer 3 (that is the total thickness of the first brazing layer 6, the second brazing layer 7 and the third brazing layer 8) is ranging from 15 μm to 150 μm. If the thickness is less than 15 μm, there is a possibility that intended melting reaction does not occur and the resultant bonding strength becomes low since controlling the ratio of each plating thickness is difficult. On the other hand, if the thickness is more than 150 μm, there is a possibility that the resultant bonding strength becomes low since the distance between the first member and the second member (i.e. the thickness of the coupling) is large.

In the case in which Pd, Ag and Cu are used as the materials constituting the joining layer 3, the joining layer 3 preferably contains 5 to 30 weight percent of Pd, 40 to 90 weight percent of Ag and 5 to 30 weight percent of Cu. More preferably, the joining layer 3 contains 10 to 25 weight percent of Pd, 50 to 80 weight percent of Ag and 20 to 30 weight percent of Cu.

Note that in the case in which Pd, Ag and Cu are used as the materials constituting the joining layer 3, the joining layer 3 preferably contains 5 to 30 volume percent (i.e. 5 to 30 thickness percent) of Pd, 40 to 90 volume percent (i.e. 40 to 90 thickness percent) of Ag and 5 to 30 volume percent (i.e. 5 to 30 thickness percent) of Cu. More preferably, the joining layer 3 contains 10 to 25 volume percent of Pd, 50 to 80 volume percent of Ag and 20 to 30 volume percent of Cu.

In the case in which the above-mentioned ratio (percentage) is used, the eutectic melting of the joining layer 3 securely proceeds.

In addition, it is preferable that the thickness of the joining layer 3 (that is the total thickness of the first brazing layer 6, the second brazing layer 7 and the third brazing layer 8) is ranging from 15 µm to 150 µm. If the thickness is less than 15 µm, there is a possibility that intended melting reaction does not occur and the resultant bonding strength becomes low since controlling the ratio of each plating thickness is difficult. On the other hand, if the thickness is more than 150 µm, there is a possibility that the resultant bonding strength becomes low since the distance between the first member and the second member (i.e. the thickness of the coupling) is large.

(In Case in which Brazing Layers are Constituted by Four Layers or More)

In the present embodiment, the case in which the joining layer 3 is constituted by three layers (the first brazing layer 6, the second brazing layer 7 and the third brazing layer 8) has been explained. Alternatively, the joining layer 3 can be constituted by four layers or more. In the case in which the joining layer 3 is constituted by four layers or more, adjacent three layers (i.e. consecutive three layers) are selected arbitrarily among the layers of four or more. Among the selected three layers, the closest layer to the member 1 (above-mentioned first member 1), the second closest layer to the member 1, and the farthest layer from the member 1 can be regarded as the first brazing layer 6, the second brazing layer 7, and the third brazing layer 8 of the present embodiment, respectively. In this case, the member 1 and one or more layers closer to the member 1 than the first brazing layer 6 are regarded as the first member. For example, when a Ni layer is provided on the member 1 for the purpose of improving its surface (for example, for the purpose of improving wettability of the member 1 to the brazing material), the member 1 and the Ni layer are regarded as the first member. On the other hand, when a Ni layer is provided on the member 2 (above-mentioned second member 2) for the purpose of improving its surface (for example, for the purpose of improving wettability of the member 2 to the brazing material), the member 2 and the Ni layer are regarded as the second member.

The present embodiment provides the same effect as the first embodiment.

In addition, in the case in which the first brazing layer, the second brazing layer and the third brazing layer are used as the materials constituting the joining layer (the brazing layers), it is possible to decrease the melting point of the joining layer since the third brazing layer can be melted using the eutectic melting of the first brazing layer and the second brazing layer (or since the first brazing layer can be melted using the eutectic melting of the second brazing layer and the third brazing layer). Note that when the first brazing layer and the third brazing layer are formed of the same material, the eutectic melting proceeds from the boundary between the first brazing layer and the second brazing layer and from the boundary between the second brazing layer and the third brazing layer simultaneously. In this case, it is possible to progress the melting of the joining layer (the first brazing layer, the second brazing layer and the third brazing layer) more uniformly.

Moreover, in the present embodiment, in the case in which Au, Ag and Cu are used as the materials constituting the brazing layers, the effect, that the firm bonding having high heat resistant temperature is acquired, is provided. Similarly, in the case in which Pd, Ag and Cu are used as the materials constituting the brazing layers, the effect, that the firm bonding having high heat resistant temperature is acquired, is provided. However, the combination of Au, Ag and Cu provides higher heat resistant temperature as compared to the combination of Pd, Ag and Cu. In addition, in the case of using the combination of Au, Ag and Cu, an embrittlement layer is less likely to be generated in the brazing layers and adequate mechanical characteristics having high elongation characteristics can be obtained.

Further, in the case in which Ag is used as the material constituting the second brazing layer (the intermediate brazing layer) in addition that Au (or Pd), Ag and Cu are used as the materials constituting the brazing layers, the melting of the Ag layer proceeds rapidly in the eutectic melting of Ag and Cu which contacts Ag on one side of the Ag layer. Therefore, it is possible to initiate the eutectic melting of Ag and Au (or Pd) which contacts Ag on the other side of the Ag layer before the melting of the Cu layer completes.

Third Embodiment

Figure 9A:
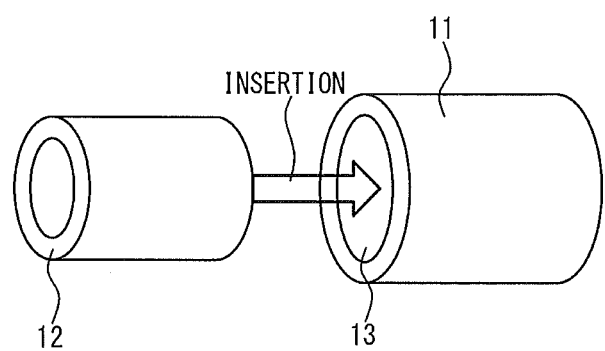
FIG. 9A is a perspective view for indicating a first state in the joining method according to a third embodiment.
Figure 9B:
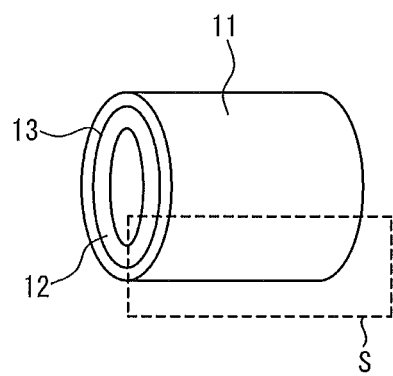
FIG. 9B is a perspective view for indicating a second state in the joining method according to the third embodiment.
Figure 9C:
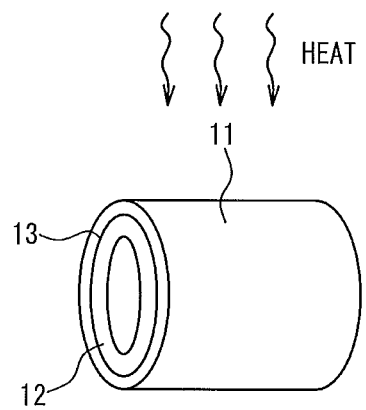
FIG. 9C is a perspective view for indicating a third state in the joining method according to the third embodiment.

Referring to FIGS. 9A to 10, the joining method according to a third embodiment will be explained. FIG. 9A is the perspective view for indicating the first state in the joining method according to the third embodiment. FIG. 9B is the perspective view for indicating the second state in the joining method according to the third embodiment. FIG. 9C is the perspective view for indicating the third state in the joining method according to the third embodiment. FIG. 10 is the cross sectional view of the section S in FIG. 9B for indicating the second state in the joining method according to the third embodiment.

The third embodiment is different from the second embodiment in a point in which the first member 11 is a cylindrical member and the second member 12 is an insertion member to be inserted in the cylindrical member in the third embodiment. The first material constituting the first brazing layer 16 (referring to FIG. 10), the second material constituting the second brazing layer 17 and the third material constituting the third brazing layer 18 are the same as the first material constituting the first brazing layer 6 (referring to FIG. 4), the second material constituting the second brazing layer 7 and the third material constituting the third brazing layer 8 in the second embodiment, respectively.

(Members to be Joined)

In the present embodiment, the first member 11 and the second member 12 are joined via the joining layer 13. The first member 11 is formed of, for example, the metal. The metal is, for example, iron or steel. The first member 11 may have the plating (e.g. Ni plating) on its surface. The first member 11 is the cylindrical member. The cylindrical member is, for example, a circular cylindrical member. The second member 12 is formed of, for example, the metal different from the metal constituting the first member 11. The metal constituting the second member 12 is, for example, a copper alloy. The second member 12 may have the plating (e.g. Ni plating) on its surface. The second member 12 is the insertion member to be inserted in the first member 11. The insertion member may be an insertion member having a solid shape or an insertion member having a hollow shape.

(Joining Layer)

As shown in FIG. 10, the joining layer 13 includes at least the first brazing layer 16, the second brazing layer 17 and the third brazing layer 18.

(Process of Providing First Brazing Layer on First Member)

The process of providing the joining layer 13 on the first member 11 includes the process of providing the first brazing layer 16 on the first member 11 by plating onto the first member 11. The plating onto the first member 11 is, for example, the electroplating, the electroless plating or the hot-dip plating (note that the hot-dip plating may not be suitable for the Au, Ag, and Cu system or the Pd, Ag, and Cu system). The plating is carried out by, for example, immersing the first member 11 in the plating bath (not shown) containing the first material. Alternatively, the plating may be carried out by applying the plating liquid containing the first material on the first member 11 without using the plating bath. Note that the masking tape and so on may be put on in advance the surface of the first member 11 on which it is not necessary to provide the joining layer 13. The masking tape prevents the joining layer 13 from being applied to the surface on which it is not necessary to provide the joining layer 13.

(Process of Providing Second Brazing Layer on First Brazing Layer)

The process of providing the joining layer 13 on the first member 11 includes the process of providing the second brazing layer 17 on the first brazing layer 16 by plating onto the first brazing layer 16. The plating onto the first brazing layer 16 is, for example, the electroplating, the electroless plating or the hot-dip plating (note that the hot-dip plating may not be suitable for the Au, Ag, and Cu system or the Pd, Ag, and Cu system). The plating is carried out by, for example, immersing the first member 11 provided with the first brazing layer 16 in the plating bath (not shown) containing the second material. Alternatively, the plating may be carried out by applying the plating liquid containing the second material on the first brazing layer 16 without using the plating bath.

(Process of Providing Third Brazing Layer on Second Brazing Layer)

The process of providing the joining layer 13 on the first member 11 includes a process of providing the third brazing layer 18 on the second brazing layer 17 by plating onto the second brazing layer 17. The plating onto the second brazing layer 17 is, for example, the electroplating, the electroless plating or the hot-dip plating (note that the hot-dip plating may not be suitable for the Au, Ag, and Cu system or the Pd, Ag, and Cu system). The plating is carried out by, for example, immersing the first member 11 provided with the first brazing layer 16 and the second brazing layer 17 in the plating bath (not shown) containing the third material. Alternatively, the plating may be carried out by applying the plating liquid containing the third material on the second brazing layer 17 without using the plating bath.

(Process of Arranging First Member and Second Member to Oppose Each Other)

As indicated by the arrow in FIG. 9A, the second member 12 is relatively moved to approach the first member 11. That is, the second member 12 is inserted in the first member 11. The insertion may be performed after the second member 12 is cooled to contract. Additionally or alternatively, the insertion may be performed after the first member 11 is heated to expand. It is possible to smoothly insert the second member 12 in the first member 11 using the contraction of the second member 12 by cooling or the expansion of the first member 11 by heating. FIG. 9B and FIG. 10 indicate a state in which the first member 11 and the second member 12 are arranged to oppose each other across the joining layer 13 as a result of the relative movement. As shown in FIG. 10, the joining layer 13 may be arranged to oppose the second member 12 across (i.e. through) the small gap 19. The small gap 19 is, for example a gap ranging from 1 μm to 2.0 mm. The opposing arrangement may be maintained by the jig (not shown).

(Process of Melting Joining Layer)

FIG. 9C indicates a state after melting the joining layer 13 by heating the joining layer 13 which is arranged between the first member 11 and the second member 12. The heating may be carried out in the heating furnace (the vacuum heating furnace, the heating furnace having the inert gas atmosphere, and so on). Alternatively, the heating may be carried out by irradiating the electron beam to the joining layer 13. Note that the pressure may be applied such that the first member 11 and the second member 12 approach one another when the heat is applied. Alternatively, the vacuum may be applied to the small gap 19 when the heat is applied. By combining the application of the pressure or the application of the vacuum with the heating, the second member 12 and the joining layer 13 contact each other and it is possible to more securely perform the joining of the first member 11 and the second member 12. For example, when the linear expansion coefficient of the second member 12 is greater than the linear expansion coefficient of the first member 11, the expansion of the second member 12 becomes greater than the expansion of the first member 11 in heating the first member 11 and the second member 12. In this way, it is possible to force the outer surface of the second member 12 to be contact with the inner surface of the joining layer 13 using the difference in the linear expansion coefficient. Alternatively or additionally, it is possible to contact the outer surface of the second member 12 with the inner surface of the joining layer 13 using a creep deformation of at least one of the first member 11 or the second member 12.

The first member 11 and the second member 12 are firmly bonded through the joining layer 13 in the process in which the melted first material, the melted second material and the melted third material are mixed and the melted materials are solidified.

(In Case in which Brazing Layers are Constituted by Four Layers or More)

In the present embodiment, the case in which the joining layer 13 is constituted by three layers (the first brazing layer 16, the second brazing layer 17 and the third brazing layer 18) has been explained. Alternatively, the joining layer 13 can be constituted by four layers or more. In the case in which the joining layer 13 is constituted by four layers or more, adjacent three layers (i.e. consecutive three layers) are selected arbitrarily among the layers of four or more. Among the selected three layers, the closest layer to the member 11 (above-mentioned first member 11), the second closest layer to the member 11, and the farthest layer from the member 11 can be regarded as the first brazing layer 16, the second brazing layer 17, and the third brazing layer 18 of the present embodiment, respectively. In this case, the member 11 and one or more layers closer to the member 11 than the first brazing layer 16 are regarded as the first member. For example, when the Ni layer is provided on the member 11 for the purpose of improving its surface (for example, for the purpose of improving wettability of the member 11 to the brazing material), the member 11 and the Ni layer are regarded as the first member. On the other hand, when the Ni layer is provided on the member 12 (above-mentioned second member 12) for the purpose of improving its surface (for example, for the purpose of improving wettability of the member 12 to the brazing material), the member 12 and the Ni layer are regarded as the second member.

The present embodiment provides the same effect as the second embodiment.

In addition, the present embodiment can be applied to the joining between the cylindrical member, which is a component of a rocket engine, and the insertion member, which is another component of the rocket engine. Note that when a brazing foil is used as the brazing material, there is a possibility that the brazing foil, which has been attached to the cylindrical member by spot welding, is separated from the cylindrical member in inserting the insertion member in the cylindrical member since the brazing foil and the insertion member are rubbed with each other. On the other hand, according to the present embodiment, since the brazing foil is not used as the brazing material, the separation of the brazing foil can be avoided.

(Alternative Example of the Third Embodiment)

Figure 11:
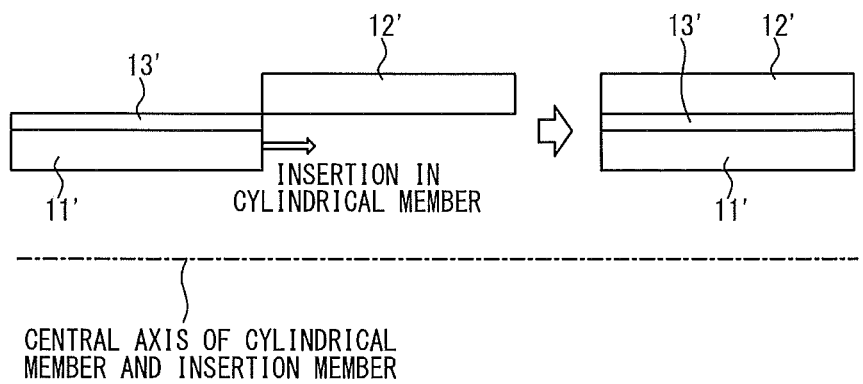
FIG. 11 is a partial cross sectional view for indicating an alternative example of the third embodiment.

Referring to FIG. 11, the joining method according to an alternative example of the third embodiment will be explained. This alternative example is different from the third embodiment in a point in which the joining layer 13' is provided on the insertion member in place of providing the joining layer 13 on the cylindrical member.

In this alternative example, the first member 11' corresponds to the insertion member. Then, the first member 11', which is the insertion member, is provided with the joining layer 13'. On the other hand, the second member 12' corresponds to the cylindrical member. The other points are the same as the third embodiment. This alternative example provides the same effect as the third embodiment.

Next, an example of a joining system according to some embodiments for using in the above-mentioned joining method will be explained.

(First Plating Device)

Figure 12A:
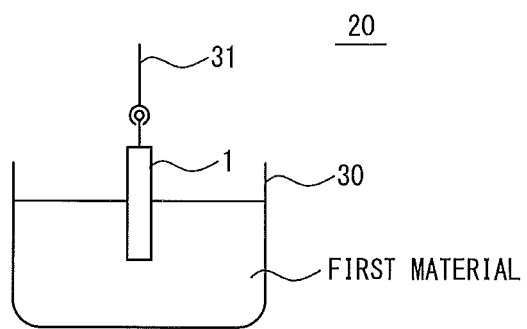
FIG. 12A is a schematic diagram for indicating a first plating device.

FIG. 12A is the schematic diagram for indicating the first plating device. The first plating device 20 is a device for performing the process of providing the first brazing layer 6 on the first member 1. The first plating device 20 includes a first plating bath 30 for storing first plating liquid containing the first material. A supporting member 31 supports the first member 1. The first member 1 supported by the supporting member 31 is immersed in the first plating liquid in the first plating bath 30. Consequently, the first brazing layer 6 is formed on the first member 1. Note that it is possible to form the first brazing layer 6 on the first member 1 using an applicator for applying the first material instead of using the first plating bath 30. The masking tape may be applied in advance on the portion of the first member 1 on which the first brazing layer 6 is not needed to apply. Note that a known device can be used as the first plating device. When an electroplating device is used as the first plating device, electrodes (not shown) are required in the device.

(Second Plating Device)

Figure 12B:
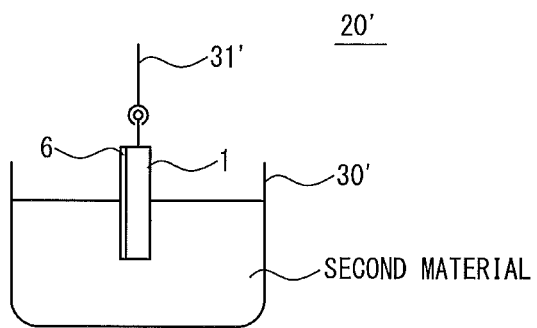
FIG. 12B is a schematic diagram for indicating a second plating device.

FIG. 12B is the schematic diagram for indicating the second plating device. The second plating device 20' is a device for performing the process of providing the second brazing layer 7 on the first brazing layer 6. The second plating device 20' includes a second plating bath 30' for storing second plating liquid containing the second material. A supporting member 31' supports the first member 1. The first member 1 supported by the supporting member 31' is immersed in the second plating liquid in the second plating bath 30'. Consequently, the second brazing layer 7 is formed on the first brazing layer 6. Note that it is possible to form the second brazing layer 7 on the first brazing layer 6 using an applicator for applying the second material instead of using the second plating bath 30'. Note that a known device can be used as the second plating device. When the electroplating device is used as the second plating device, electrodes (not shown) are required in the device.

(Third Plating Device)

Figure 12C:
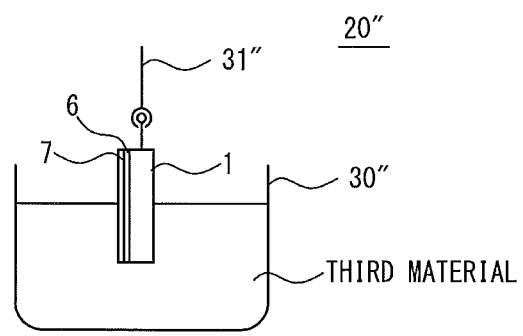
FIG. 12C is a schematic diagram for indicating a third plating device.

FIG. 12C is the schematic diagram for indicating the third plating device. The third plating device 20" is a device for performing the process of providing the third brazing layer 8 on the second brazing layer 7. The third plating device 20" includes a third plating bath 30" for storing third plating liquid containing the third material. A supporting member 31" supports the first member 1. The first member 1 supported by the supporting member 31" is immersed in the third plating liquid in the third plating bath 30". Consequently, the third brazing layer 8 is formed on the second brazing layer 7. Note that it is possible to form the third brazing layer 8 on the second brazing layer 7 using an applicator for applying the third material instead of using the third plating bath 30". Note that a known device can be used as the third plating device. When the electroplating device is used as the third plating device, electrodes (not shown) are required in the device.

(Holding Device)

Figure 13:
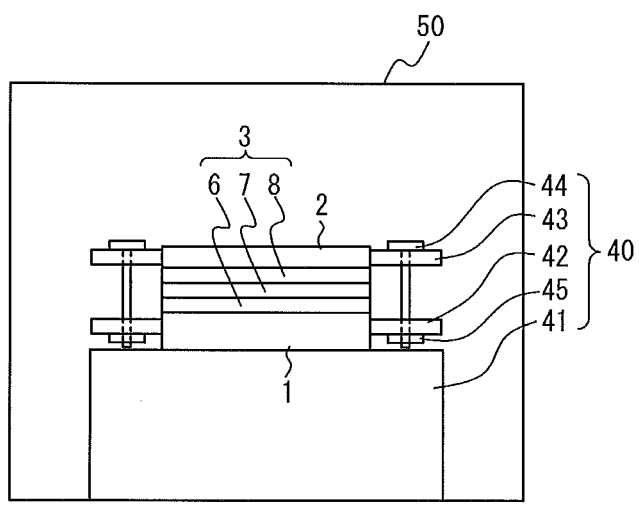
FIG. 13 is a schematic diagram for indicating a holding device and a heating device.

FIG. 13 is the schematic diagram for indicating the holding device and the heating device. The holding device 40 is a device for holding the first member 1 and the second member 2 in a state in which the first member 1 and the second member 2 are opposed to each other across the joining layer 3 (the first brazing layer 6, the second brazing layer 7 and the third brazing layer 8). The holding device 40 includes a table 41 on which the first member 1 is placed, a first holding bracket 42 to be attached to the first member 1, a second holding bracket 43 to be attached to the second member 2, a bolt 44 and a nut 45. The first holding bracket 42 and the second holding bracket 43 are fixed so as to prevent a relative movement by the bolt 44 and the nut 45. Consequently, the first member 1 and the second member 2 are held in the state in which the first member 1 and the second member 2 are opposed to each other across the joining layer 3. The holding device 40 may be any device as long as the device can hold the first member 1 and the second member 2 in the state in which the first member 1 and the second member 2 are opposed to each other across the joining layer 3. Note that when a fixing jig such as the bolt 44 and the nut 45 is used, it is necessary to pay attention to select material of the fixing jig such that the fixing jig is less likely to be loosened due to the deference between the linear expansion coefficient of a member to be joined such as the first member 1 and the second member 2 and the linear expansion coefficient of the fixing jig.

(Heating Device)

FIG. 13 is the schematic diagram for indicating the holding device and the heating device. The heating device 50 is a device for performing the process of joining the first member 1 and the second member 2, which are arranged to oppose each other, by melting the joining layer 3. The heating device 50 is, for example, the vacuum heating furnace, the heating furnace having the inert gas atmosphere and so on. The vacuum heating furnace is a furnace in which the members to be joined (the first member 1 and the second member 2) are heated in the vacuum atmosphere (i.e. in the vacuum chamber). The heating device 50 bonds between the first member 1 and the second member 2 by melting the joining layer 3. Note that the heating device 50 may be any device as long as the device can bond between the first member 1 and the second member 2 by melting the joining layer 3.

Note that, in the present embodiment, the first material constituting the first brazing layer 6 is a different material from the second material constituting the second brazing layer 7, and the second material constituting the second brazing layer 7 is a different material from the third material constituting the third brazing layer 8. Note that the first material constituting the first brazing layer 6 may be the same material as the third material constituting the third brazing layer 8 or may be a different material from the third material constituting the third brazing layer.

Note that, in the present embodiment, the case in which the joining layer 3 is constituted by three layers (the first brazing layer 6, the second brazing layer 7 and the third brazing layer 8) has been explained. However, the brazing layers may be constituted by two layers. In the case in which the brazing layers are constituted by two layers, the third plating device can be omitted. Alternatively, the brazing layers may be constituted by four layers or more.

In the present embodiment, the first plating device for applying the first material, the second plating device for applying the second material and the third plating device for applying the third material are provided independently. Therefore, it is not necessary to prepare the plating liquid of mixed material. In addition, since each device of the first plating device for applying the first material, the second plating device for applying the second material and the third plating device for applying the third material is a device for applying a material composed of a single material (a single substance), the device has high applicability. For example, the case in which the first material is Au, the second material is Ag and the third material is Cu will be considered. For providing the joining layer (the brazing layers) constituted by the Au layer and the Ag layer, it is sufficient to use the first plating device and the second plating device. On the other hand, for providing the joining layer (the brazing layers) constituted by the Au layer and the Cu layer, it is sufficient to use the first plating device and the third plating device. Alternatively, for providing the joining layer (the brazing layers) constituted by the Au layer, the Ag layer and the Cu layer, the first plating device, the second plating device and the third plating device may be used.

The present invention is not limited to the above-mentioned embodiments. Various modifications can be performed on the above-mentioned embodiments in the scope of the technical concept of the present invention. For example, in the above, the example in which the first brazing layer 4 and the second brazing layer 5 are consecutively plated on the first member 1 and so on has been presented. However, embodiments are not limited to the above-mentioned example. For example, it is possible that the first brazing layer 4 is plated on the first member 1, the second brazing layer 5 is plated on the first brazing layer 4, the third brazing layer formed of the same material as the material constituting the first brazing layer 4 is plated on the second brazing layer, the fourth brazing layer formed of the same material as the material constituting the second brazing layer 5 is plated on the third brazing layer, and the second member 2 is arranged to oppose the fourth brazing layer. That is, if what the first brazing layer is plated and the second brazing layer is plated is defined as a cycle, the joining layer may be prepared by repeating the cycle. Alternatively, if what the first brazing layer is plated, the second brazing layer is plated and the third brazing layer is plated is defined as a cycle, the joining layer may be prepared by repeating the cycle. By preparing the joining layer using more than one cycle, each brazing layer can be thinner. Consequently, it is possible to progress the eutectic melting more uniformly. Note that, in the above, the example in which the joining layer is provided on the first member 1 has been explained. However, the joining layer may be provided on the second member 2. Moreover, various techniques used in some embodiments or alternatives can be applicable to other embodiments or alternatives as long as the technical contradiction does not occur.

What is claimed is:

1. A joining method for joining a first member and a second member comprising:
    providing a joining layer on the first member;
    arranging the first member and the second member to oppose each other across the joining layer; and
    melting the joining layer to join the first member and the second member which are arranged to oppose each other,
    wherein the providing a joining layer on the first member comprises:
    providing a first brazing layer on the first member by plating;
    providing a second brazing layer on the first brazing layer by plating; and
    providing a third brazing layer on the second brazing layer by plating,
    wherein a first material constituting the first brazing layer is a material different from a second material constituting the second brazing layer,
    wherein a third material constituting the third brazing layer is a material different from the second material constituting the second brazing layer,
    wherein the melting the joining layer comprises an eutectic melting,
    wherein the second material is selected such that melting of the second material proceeds more rapidly than melting of at least one of the first material and the third material in said eutectic melting,
    wherein the arranging the first member and the second member comprises arranging the third brazing layer to oppose the second member across a gap such that the third brazing layer does not contact the second member, and
    wherein the melting the joining layer to join the first member and the second member comprises bringing the third brazing layer into contact with the second member.

2. The joining method according to claim 1, wherein the first material constituting the first brazing layer is the same material as the third material constituting the third brazing layer.

3. The joining method according to claim 1, wherein the first material constituting the first brazing layer is different from the third material constituting the third brazing layer.

4. The joining method according to claim 3, wherein the first brazing layer is selected from the group consisting of a Cu layer, an Ag layer and at least one of an Au layer or a Pd layer,
    wherein the second brazing layer is selected from the group consisting of a Cu layer, an Ag layer, and at least one of an Au layer or a Pd layer,
    wherein the third brazing layer is selected from the group consisting of a Cu layer, an Ag layer, and at least one of an Au layer or a Pd layer.

5. The joining method according to claim 4, wherein the second brazing layer is the Ag layer.

6. The joining method according to claim 1, wherein the first member is one of a cylindrical member or an insertion member to be inserted in the cylindrical member,
    wherein the second member is the other of the cylindrical member or the insertion member.

7. The joining method according to claim 6, wherein the cylindrical member is an outer cylindrical member which constitutes an engine,
wherein the insertion member is an inner cylindrical member which constitutes the engine.

8. The joining method according to claim 1, wherein the third brazing layer is arranged to oppose the second member across the gap such that the third brazing layer does not contact the second member at a beginning of the melting of the joining layer.

9. The joining method according to claim 1, wherein the third brazing layer is brought into contact with the second member by pressing one of the first member and the second member in a direction in which the first member relatively approaches the second member.

10. The joining method according to claim 1, wherein the third brazing layer is brought into contact with the second member by vacuuming a space of the gap.

11. The joining method according to claim 1, wherein the third brazing layer is brought into contact with the second member by a linear expansion of the first member and the second member.

* * * * *